(12) United States Patent
Petitjean et al.

(10) Patent No.: US 8,047,772 B2
(45) Date of Patent: Nov. 1, 2011

(54) VARIABLE GEOMETRY TURBINE FOR A TURBOCHARGER AND METHOD OF CONTROLLING THE TURBINE

(75) Inventors: Dominque Petitjean, Julienrupt (FR); Phillippe Arnold, Henncourt (FR); Jerome Mitka, Houdemont (FR)

(73) Assignee: Honeywell International Inc., Morristown, NJ (US)

( * ) Notice: Subject to any disclaimer, the term of this patent is extended or adjusted under 35 U.S.C. 154(b) by 634 days.

(21) Appl. No.: 11/886,834

(22) PCT Filed: Mar. 25, 2005

(86) PCT No.: PCT/EP2005/003314
§ 371 (c)(1),
(2), (4) Date: Dec. 5, 2008

(87) PCT Pub. No.: WO2006/102912
PCT Pub. Date: Oct. 5, 2006

(65) Prior Publication Data
US 2009/0169366 A1 Jul. 2, 2009

(51) Int. Cl.
*F01B 25/02* (2006.01)
*F01B 25/10* (2006.01)
(52) U.S. Cl. ........................................ 415/158
(58) Field of Classification Search ................ 415/158
See application file for complete search history.

(56) References Cited

U.S. PATENT DOCUMENTS

| | | | | |
|---|---|---|---|---|
| 2,918,207 A * | 12/1959 | Moore | ........................... | 417/373 |
| 3,075,742 A * | 1/1963 | Aldag | ........................... | 415/146 |
| 4,406,125 A * | 9/1983 | Rahnke | ........................... | 60/602 |
| 4,499,731 A * | 2/1985 | Moser | ........................... | 60/602 |
| 5,311,749 A * | 5/1994 | McAuliffe et al. | ........................... | 62/402 |
| 5,441,383 A | 8/1995 | Dale et al. | | |
| 5,579,643 A * | 12/1996 | McEwen et al. | ........................... | 60/602 |
| 5,855,117 A * | 1/1999 | Sumser et al. | ........................... | 60/602 |
| 5,964,574 A * | 10/1999 | Meier et al. | ........................... | 415/110 |
| 6,648,594 B1 | 11/2003 | Horner et al. | | |
| 6,715,288 B1 * | 4/2004 | Engels et al. | ........................... | 60/602 |
| 6,729,134 B2 * | 5/2004 | Arnold et al. | ........................... | 60/602 |
| 6,928,816 B2 * | 8/2005 | Leavesley | ........................... | 60/602 |
| 7,010,918 B2 * | 3/2006 | Ruess | ........................... | 60/624 |
| 7,047,739 B2 * | 5/2006 | Fledersbacher et al. | ........................... | 60/602 |
| 7,097,432 B1 * | 8/2006 | Lombard et al. | ........................... | 417/295 |
| 7,338,254 B2 * | 3/2008 | Lombard et al. | ........................... | 415/167 |
| 7,762,067 B2 * | 7/2010 | Bouvier et al. | ........................... | 60/602 |
| 2002/0004007 A1 * | 1/2002 | Doring et al. | ........................... | 415/203 |

FOREIGN PATENT DOCUMENTS

| | | |
|---|---|---|
| DE | 3606944 | 10/1987 |
| DE | 10328167 | 6/2003 |
| WO | 2004048755 | 10/2004 |

* cited by examiner

OTHER PUBLICATIONS

PCT ISR/WO Honeywell.

*Primary Examiner* — Benjamin Sandvik
*Assistant Examiner* — Joseph Schoenholtz
(74) *Attorney, Agent, or Firm* — Alston & Bird LLP

(57) ABSTRACT

There is described a variable geometry turbine having a sliding element (5) for the control of the section throat of the turbine (1) by sliding movement along an axial direction of a turbine wheel (71). The turbine wheel operates to convert a flow of working fluid into mechanical energy. At least one bypass channel (51) is defined in the sliding element (5). The bypass channel is further connected to a turbine wheel outlet area (79) downstream of the turbine wheel for selectively guiding an excess flow of working fluid past the turbine wheel (71), so as to control the operation of the turbine. A use of the variable geometry turbine with a turbocharger for an engine and a method for controlling such turbine is also described.

20 Claims, 4 Drawing Sheets

VARIABLE GEOMETRY TURBINE FOR A TURBOCHARGER AND METHOD OF CONTROLLING THE TURBINE

The present invention relates to a variable geometry turbine. Such variable geometry turbines are e.g. used in turbochargers for mobile or stationary engines. Other applications of the such variable geometry turbines are possible and promising, wherever a variable turbine performance (torque and speed) is to be provided at a variable drive medium flow driving the turbine. A turbocharger using a variable inlet nozzle exhaust driven turbine is known from U.S. Pat. No. 5,441,383.

This prior art document describes an exhaust driven turbine having an inlet nozzle, the section throat of which may be controlled by sliding movement of a sliding element in the form of a sleeve which slides in the axial direction of the turbine wheel in the exhaust duct of the turbine. The sleeve is arranged such that it at least partly surrounds the turbine wheel.

With the sliding movement of the sleeve, the sectional area of the inlet nozzle can be controlled by suitably controlling the overlap of the sliding element and the substantially ring-shaped inlet nozzle.

There are vanes provided which span the open section of the inlet nozzle in axial direction of the turbine wheel. The vanes may be fixed to the sleeve or the center housing. In the former case, suitable slits in the turbine housing receive those portions of the vanes which do not extend across the open section of the inlet nozzle. In the latter case, suitable slits in a collar portion of the sleeve allow an axial relative movement between the vanes and the sleeve, so that the section throat of the inlet nozzle which is free to pass the exhaust gas flow is provided with the vanes for giving the gas flow a suitable direction before it reaches the turbine wheel.

However, control of the inlet nozzle of the turbine is one part of the control of the turbine operating range. The control range of the turbine performance can be extended by using further control means for the control of gas flow through the turbine, which are used in combination with variable inlet nozzle turbines using such sliding sleeves.

One possibility is to use the so-called waste gate which is an external bypass which bypasses a portion of the exhaust gas flow upstream the section throat of the turbine, which is not required for driving the turbine, down to the turbine outlet. This type of bypass requires additional components such as piping, an additional control valve and an actuator for controlling the cross section of the bypass so as to control the exhaust gas amount which is guided past the turbine.

Another possibility is the use of internal bypasses which bypass turbine flow downstream the turbine section throat to the turbine outlet. These bypasses may be arranged externally similar to the above waste gate arrangement, so that also additional components are required.

Finally, there is also known to use internal bypasses leading inside the turbine from downstream of the turbine section throat to the downstream side of the turbine wheel. Such type of bypass guides a bypass flow of exhaust gas along with the turbine main flow and past the turbine wheel under control of a sliding element. No additional parts are required.

With the increasing demand on the performance of engines with regard to the generated torque in particular in ranges of low engine speeds, the demand on the operating range of the turbochargers has increased.

In view of the above, there is a need for efficient turbines having a large operational range and having a simple structure.

In particular, there is a need for efficient variable geometry turbines having a large operational range, which turbines can be economically produced.

Further, there is a need for variable geometry turbines having a large operating range by providing a controllable bypass for bypassing a gas medium flow past a turbine wheel, which turbines require no additional parts for the control of the bypass.

Similar needs exist for turbochargers, in particular for turbochargers used in automobile engines, which are produced in large lot, so that a design promoting economic production is of considerable importance.

Also, a need exists with regard to the control method of a variable geometry turbine in which method an efficient control of the turbine is achieved in that a large operational range of the turbine can be provided over which the turbine operates with high efficiency.

The above needs are fulfilled with a turbine according to a first aspect of the invention, with a turbocharger according to a second aspect of the invention, and with a method according to a third aspect of the invention, respectively.

According to the first aspect of the invention, a variable geometry turbine is provided which has a sliding element for the control of the section throat of the turbine by sliding movement along an axial direction of a turbine wheel, wherein at least one bypass channel is defined in the sliding element and connected to a turbine wheel outlet area for selectively guiding an excess flow of working fluid past the turbine wheel.

The outlet of the bypass channel may open into the turbine outlet area in any direction. In an advantageous form of the turbine according to the first aspect, a downstream end of the bypass channel opens into the turbine wheel outlet area in an axial direction with regard to the rotational axis of the turbine wheel.

In a further advantageous modification, the downstream end of the bypass channel has a substantially annular opening which surrounds the turbine outlet area. This opening may open into the turbine outlet area in any direction, be it axial, radial or at any angle with regard to the flow direction of the turbine wheel main flow.

In an advantageous modification, the downstream end of the bypass channel may be formed as a substantially ring-shaped nozzle for accelerating and ejecting the excess flow of working fluid in the direction of the turbine wheel main flow.

Also, the downstream end of the bypass channel may consist of separate openings which may be arranged somewhere around the turbine wheel outlet area, and in an advantageous form, the downstream end comprises a single opening extending over 360° around the rotational axis of the turbine wheel.

In the variable geometry turbine according to the first aspect of the invention, the bypass channel is selectively connectable to a flow of working fluid upstream of the section throat of the turbine by a sliding movement of the sliding element. Alternatively, the bypass channel is selectively connectable to a flow of working fluid downstream of the section throat of the turbine by a sliding movement of the sliding element.

In an advantageous form of the variable geometry turbine according to the first aspect, an opening degree of the bypass channel is continuously or stepwise variable. Here, the opening degree of the bypass channel may be variable depending on an axial sliding position of the sliding element. Alternatively, the opening degree of the bypass channel may be variable dependent on a rotated position of the sliding element when rotated around the rotational axis of the turbine wheel.

The set-up of a variable geometry turbine according to the first aspect of the invention may comprise a structure in which the turbine wheel is arranged in a turbine housing having a flow path for the working fluid to said turbine wheel, and a passage connected to the flow path, the passage has at least one opening which is selectively opened or closed by the sliding element, and the passage is connected to the bypass channel via a hole, when the opening is at least partially open. Advantageously, it may be arranged that the opening and the hole are displaceable relatively to each other, and an opening degree of the passage is governed by an overlapping degree of the opening and the hole.

In an advantageous modification of the variable geometry turbine according to the foregoing structure, the section throat of the turbine is equipped with at least one vane, the opening is formed in the vane, and the hole is formed in a portion of the sliding element which cooperates with the vane. The passage may be connected to a portion of the flow path upstream the section throat of the turbine or the passage may be connected to a portion of the flow path downstream of the section throat of the turbine.

The second aspect of the invention provides a turbocharger, comprising a variable geometry turbine according to the first aspect and its modifications outlined above, for operation with exhaust gas of an engine as the working fluid, and further comprising a compressor for compressing air to be supplied to the engine, wherein the turbine wheel and the compressor wheel are fixed to a common shaft. The compressor and its parts may be of any known type including compressors of variable or fixed geometry.

According to the third aspect of the invention, a method for controlling a variable geometry turbine is provided, wherein the method comprises the steps of providing a bypass channel connected to the outlet area of the turbine wheel in a sliding element for controlling section throat of the turbine, selectively and variably connecting the bypass channel with the flow of working fluid, in order to guide an excess flow of working fluid to bypass the turbine wheel, and releasing the excess flow of working fluid into the turbine outlet area. In this method, the step of variably and selectively connecting the bypass channel may comprise the step of varying an overlap of an opening from the working fluid flow path and an opening of the bypass channel by an axial sliding movement of the sliding element.

In an advantageous form of this aspect of the invention, the excess flow of working fluid is ejected in the flow direction of the flow of working fluid in the turbine outlet area. Here the step of ejecting the excess flow of working fluid may comprise the step of forming an accelerated and substantially cylindrically shaped gas layer surrounding the turbine wheel main flow, so that this gas layer locally reduces turbine wheel outlet pressure and improves turbine performance.

The invention is based on the finding that a particular arrangement of a bypass channel in the sliding element ensures high flow efficiency of the bypass in a less complex structure of a turbine. A particular advantage as compared to an external bypass such as a waste gate is to be seen in that no additional actuation means for control of the bypass as such are required while obtaining the high flow efficiency of an external bypass.

With the invention, thus, a variable geometry turbine with a simplified structure is provided which is efficiently operable over a large range of working fluid flow amounts. In this turbine, a bypass channel is defined in the sliding element which is for the control of the section throat of the turbine, i.e. the size of the intake nozzle of the turbine. Since this bypass channel in the sliding element passes the turbine and ends in the outlet area of the turbine, already a less complex and efficient structure is obtained by arranging the bypass channel in the sliding element (low complexity) and by providing a special or separate bypass channel (improved efficiency).

Further, since the bypass channel is arranged in the sliding element, it may, in an advantageous form of carrying out the invention, slide together therewith for being connected/disconnected to/from the working fluid flow to the turbine wheel. It may be arranged such that overlapping positions of openings and holes which allow the access of the working fluid into the bypass channel are set such that an excess flow will be guided past the turbine wheel after the section throat of the turbine has almost reached its maximum. Thus, a linear movement of the sliding element controls section throat and further linear movement (in the same direction) of the sliding element should then open the bypass channel. Accordingly, a significant simplification of the control of the turbine can be achieved, since one and the same actuating means for moving the sliding element can be used to control the opening degree (flow capacity) of the bypass channel.

The invention will now be further explained by reference being made to the drawings showing an embodiment of the invention.

In the drawings:

FIG. 1 shows related parts of a turbocharger in which an embodiment of the variable geometry turbine according to the invention is incorporated.

Figure 1:
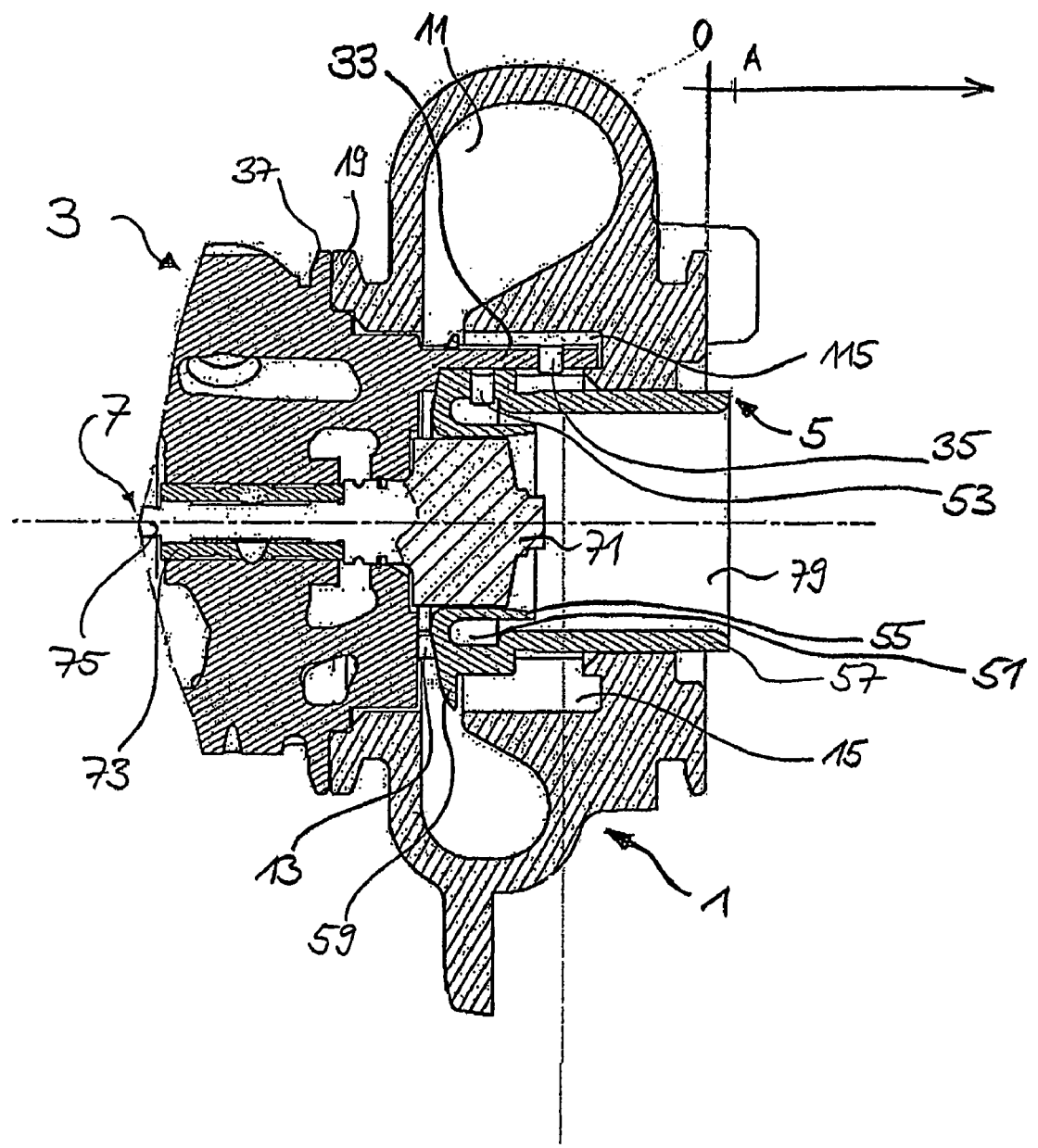
FIG. 1 shows a schematic sectional view of related parts of a turbocharger using a variable geometry turbine according to an embodiment of the invention with a sliding element being in a first position.

The general arrangement of a turbocharger has a turbine housing 1, an central housing 3, and a compressor housing (not shown) unified to form the turbocharger. A drive assembly 7 comprises a turbine wheel 71 fixed to a shaft 75 to which shaft 75 a compressor wheel (not shown) is fixed so as to rotate in unison with the turbine wheel 71. In the central housing 3, there is provided a bearing 73 for the shaft 75. It is noted that a compressor housing (not shown) containing any type of known compressors, in particular fixed or variable geometry compressors which are known in the art, may be used in the turbocharger described hereafter, and the compressor is not shown in the drawings for the sake of clarity. The compressor housing will be fixed to the left in FIG. 1 of the central housing 3.

In the following, the terms right side and left side of the turbine or turbocharger will be used, and these terms relate to the right side and left side in any one of FIG. 1 to 4.

To the right side of the central housing 3, there is attached the turbine housing 1 in which a volute 11 is defined. The housings 3 and 1 may be connected by any suitable manner known in the art. Here two opposing flanges 37 and 19 are provided which are connected by a clamping ring (not shown). A working fluid, here an exhaust gas of an engine, flows through the volute 11 which has a decreasing cross-sectional area in flow direction of the working fluid so as to increase the flow speed of the fluid. At the radial inner side of the volute 11 there is provided a ring-shaped passage 111

(FIG. 3) for leading a flow of working fluid to the turbine wheel 71. The turbine housing 1 is made from cast metal or other suitable material known in the art. Further, an annular passage 15 surrounding the turbine wheel 71 and extending in axial direction of the turbine wheel 71 is formed in the turbine housing 1 and the annular passage 15 is in fluid connection to the ring-shaped passage 111 which connects the volute 11 and the inlet nozzle or section throat 13 of the turbine.

Radially inward annular passage 15, there is arranged a sliding element 5 which is supported by the turbine housing 1 so as to be sildeable to the left and right in FIG. 1, i.e. in axial direction of the turbine wheel 71. A sealing function (not shown) is provided which prohibits a flow of working fluid to the outside of the turbocharger between the outer surface of the sliding element 5 and the turbine housing 1. The sliding element 5 is connected to an actuating means (not shown) which moves the sliding element 5 to the left or right in FIG. 1. Any type of suitable actuator may be used, be it a pressure operated actuator or an actuator using other drive force (electric/hydraulic and the like) for adjusting the position of the slide member 5, so as to control turbine flow capacity. The control of the position of the slide member may be done in any manner known in the art.

The sliding element 5 is basically composed of a sleeve portion 57, a collar portion 59 formed at the left side root portion of the sleeve portion 57, and a tubular wall portion 55 arranged radially inside the sleeve portion 57 and extending parallel to the sleeve portion 57 from the collar portion 59. There is a gap formed between the sleeve portion 57 and the tubular wall portion 55. This gap forms the bypass channel 51 which opens into the free space inside the sleeve portion 57 of the sliding element 5. This free space is hereafter named turbine wheel outlet area and is marked with reference sign 79. The left face of the collar portion 59 has an aerodynamic shape so as to form one side face of the section throat 13 of the turbine. The tubular wall portion 55 is concentric to the turbine wheel 71 and has an internal diameter which is slightly larger than the outer diameter of the turbine wheel 71, so as to force the working fluid leaving the section throat 13 to pass through the turbine wheel 71 and to rotate the latter.

In the upper half of FIG. 1, there is shown a vane 33 extending form the central housing body 31 into the turbine housing 1, such that the vane 33 is received in the annular passage 15. It is noted that the size of the vane is set such that it only partly fills the annular passage 15 and maintains an open channel portion 115 at its radial outside surface, which channel portion 115 is connected to the ring-shaped passage 111 connected to the volute 11. In FIG. 1 there is shown an opening 35 provided in the vane 33, this opening 35 being directed in a radial direction with regard to the turbine wheel 71, and the opening is arranged between a foot end and a tip end of the vane 33 and closer to the tip end thereof. The function and position of this opening 35 will be described later.

The collar portion 59 of the sliding element 5 is arranged such that a suitable slit is provided which receives the vane 33 in it, so as to slide relatively thereto when the sliding element 5 slides in the turbine housing 1. Also, the sleeve portion 57 of the sliding element 5 is provided with a hole 53 which passes through the sleeve portion 57 and extends in substantially radial direction of the sliding element 5. The hole ends in the bypass channel 51, i.e. the hole does not extend through the tubular wall portion 55. It is noted that the opening 35 and the hole 53 may have any shape which allows to perform the functioning as a control valve for an exhaust gas flow through the bypass channel 15.

In the following, reference is made to FIGS. 1, 2, 3 and 4 each showing a different position of the sliding element 5, wherein the positions are marked with capitals A, B, C, D. It is noted that the positions are only used as examples for explanation of the function. The sliding element may be continuously adjustable at any position between the two end positions A (FIG. 1) and D (FIG. 4). For the positions, the right end face of the turbine housing 1 is used as an arbitrarily set reference point 0. Also stepwise control of the sliding element may be provided.

Figure 2:
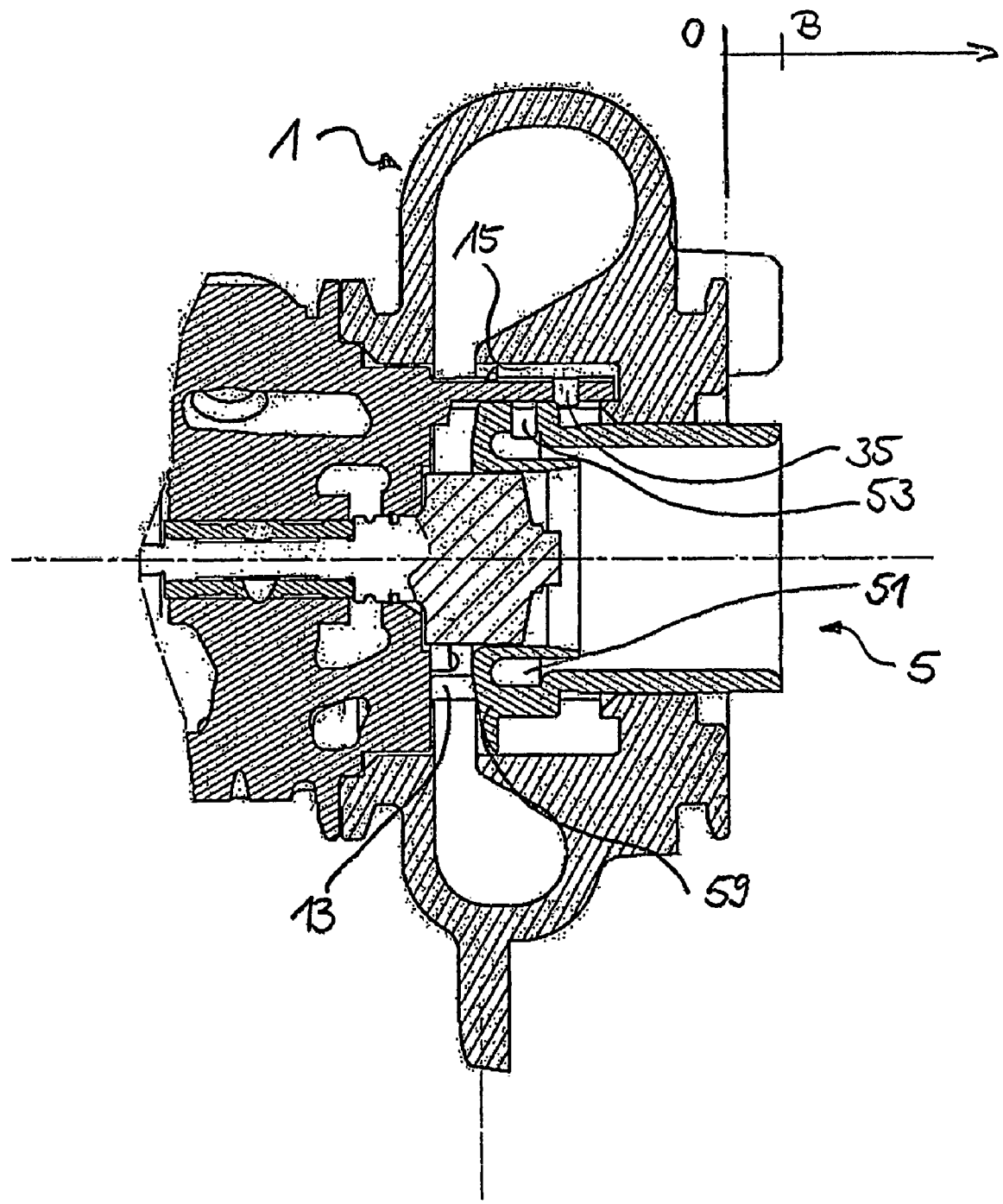
FIG. 2 shows the same sectional view as FIG. 1 with the sliding element being in a second position.

In the drawings, the sliding element 5 is moved e.g. starting from position A to reach a position B in FIG. 2. With this movement, the collar portion 59 of the sliding element lifts from the respective seat on the turbine housing 1 and, with increasing movement towards the right in the drawings, the free area through which the working fluid may flow through the section throat 13 increases. Thus, the flow of working fluid to the turbine wheel 71 is controlled in a suitable manner. The shape of the collar portion 59 of the sliding element forms a part of in inlet nozzle suitably guiding the flow of working fluid to the turbine wheel 71.

Comparing FIGS. 1 and 2, it is to be seen that the opening 35 in the vane 33 and the hole 53 in the sleeve portion 57 have approached each other but are not in an overlapped condition in FIGS. 1 and 2. Accordingly, the bypass channel 51 is not connected to the ring-shaped passage 15 in which working-fluid from upstream the section throat of the turbine is present.

Figure 3:
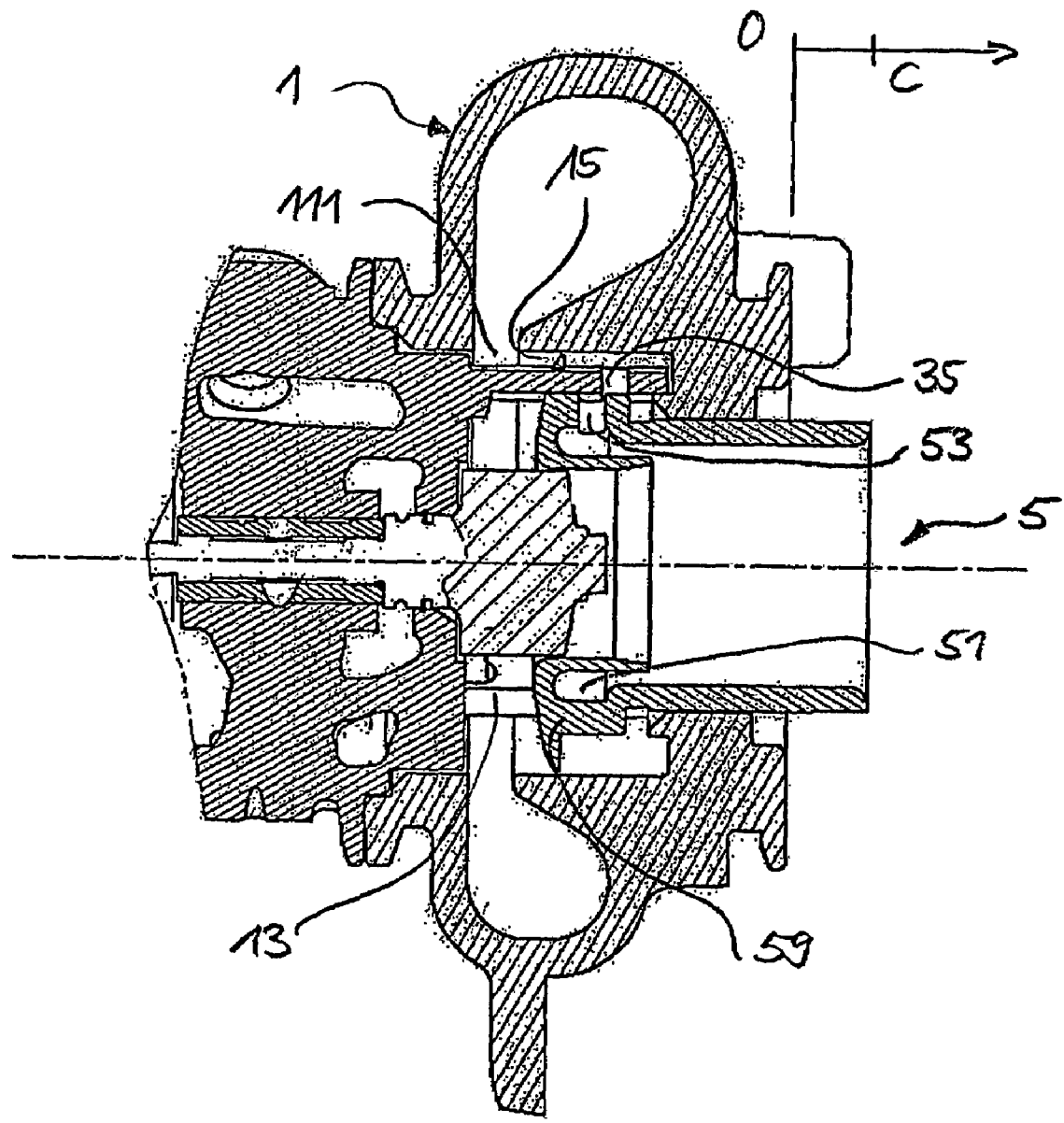
FIG. 3 shows the same sectional view as FIG. 1 with the sliding element being in a third position.
Figure 4:
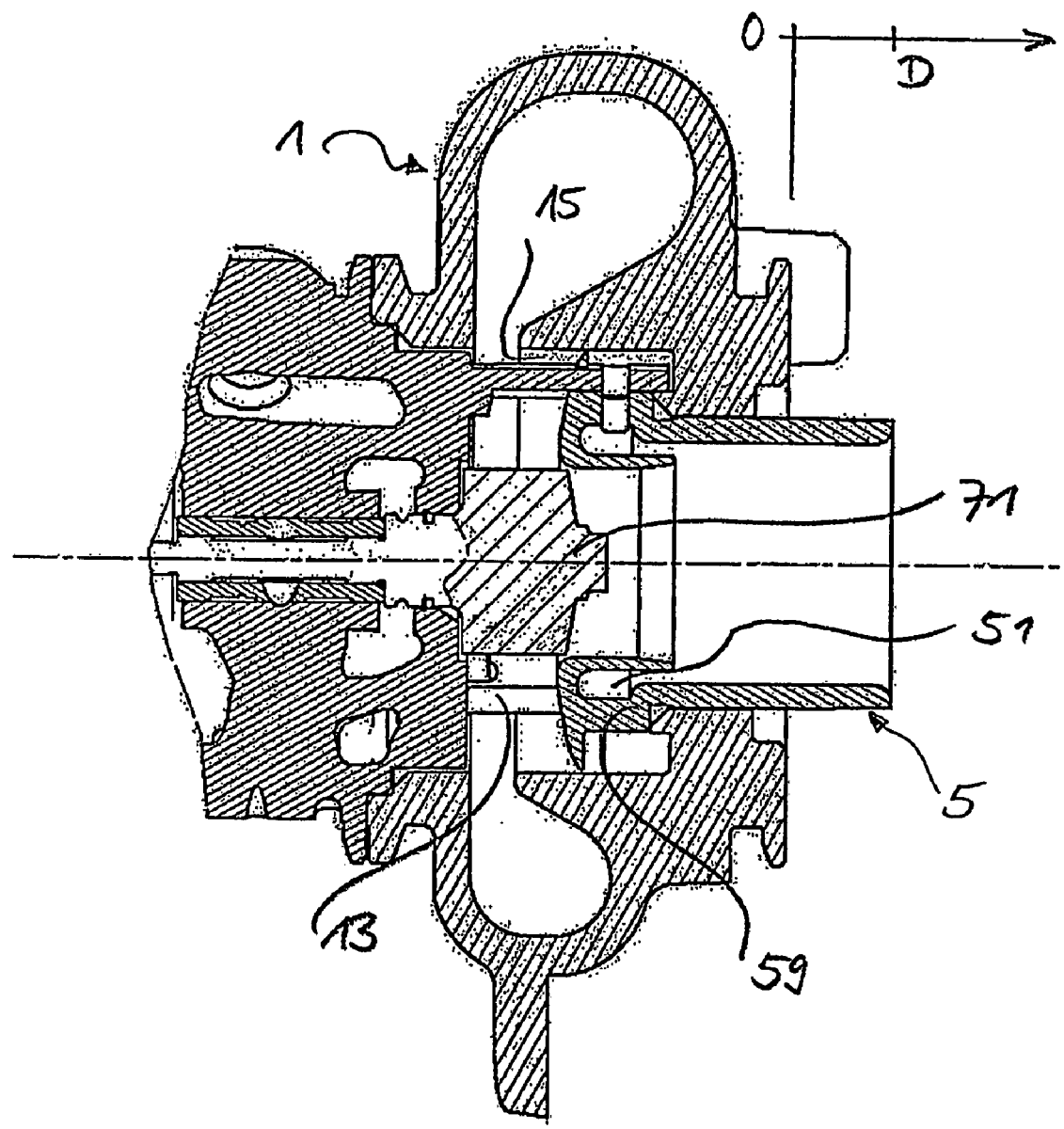
FIG. 4 shows the same sectional view as FIG. 1 with the sliding element being in a fourth position.

Further axial movement of the sliding element 5 brings the sliding element into the position C shown in FIG. 3, while the section throat 13 is further opened by the collar portion 59 of the sliding element 5. In the position C, the opening 35 and the hole 53 are in a relative position where the introduction of a bypass flow of working fluid into the bypass channel 51 (via opening 35 and hole 53) just begins at the slightly overlapping portions of the opening 35 and the hole 53. Accordingly, with further increase of the lift of the sliding element from the seat, i.e. movement thereof from position C towards position D (FIG. 4) the flow of working fluid passing through the bypass channel 51 increases with an increasing overlap between the open cross sections of the opening 35 and the hole 53. In position D, finally, the opening 35 and the hole 35 are flush, so that the flow of working fluid bypassing the turbine wheel 71 is maximum, while also the section throat is maximum.

As a result, the sliding element, thus, forms a control valve for connecting disconnecting the bypass channel 51 to the volute 11. In the shown embodiment, it is arranged that the full overlap of the opening 35 and the hole 53 is obtained, when the sliding element 5 is in its end position D (maximum to the right in FIG. 4). However, it may be arranged that e.g. the full opening of the bypass control valve (opening 35 and hole 53) may already be achieved at a more left position of the sliding element 5, and is maintained open while the section throat is further opened. Also, as one further alternative, the opening 35 and the hole 53 may be shaped such that the overlapping degree of opening 35 and hole 53 (i.e. the opening degree of the bypass control valve) continuously or stepwise changes according to a prescribed relation between opening degree and sliding member position (or opening degree of section throat of the turbine). This can e.g. be obtained by suitably shaping the opening 35 and the hole 53.

It is arranged in the embodiment shown that the bypass channel starts to bypass working fluid past the turbine wheel, when or after the section throat of the turbine has been adjusted to its maximum flow capacity. This shows that in this embodiment the same kind of movement (sliding movement in axial directions) of the same element (the sliding element)

are used to control the section throat of the turbine and the bypass flow by simply moving the sliding element further with the same actuator. Accordingly a significant simplification of the control means and of the control method for a variable geometry turbine having a bypass is obtained.

Finally, the bypass channel 51 is arranged as shown, in order to form a ring-shaped nozzle which accelerates the bypass flow to form a tubular flow curtain in the outlet area of the turbine and surrounding the working fluid main flow of the turbine. This locally reduces the pressure in the turbine outlet and improves turbine efficiency. However, this is only a particular shape and function of the outlet end of the bypass channel, and in principle the outlet end of the bypass may have any shape of opening which enter the turbine outlet area at any angle.

We claim:

1. A variable geometry turbine having a sliding element (5) for the control of the section throat of the turbine (1) by sliding movement along an axial direction of a turbine wheel (71), characterized by
at least one bypass channel (51) defined in said sliding element (5) and connected to a turbine wheel outlet area (79) for selectively guiding an excess flow of working fluid past the turbine wheel (71).

2. A variable geometry turbine according to claim 1, wherein said downstream end of said bypass channel (51) is substantially annular and surrounds the turbine outlet area (79).

3. A variable geometry turbine according to claim 1 or 2, wherein a downstream end of said bypass channel (51) opens into the turbine wheel outlet area (79) in an axial direction with regard to the rotational axis of the turbine wheel.

4. A variable geometry turbine according to claim 1, wherein said downstream end of said bypass channel (51) forms a substantially ring-shaped nozzle for accelerating and ejecting the excess flow of working fluid in the direction of the turbine wheel main flow.

5. A variable geometry turbine according to claim 1, wherein said downstream end of said bypass channel (51) is a continuous opening extending over 360° around the rotational axis of the turbine wheel (71), and opening into the turbine wheel outlet area (79) at an angle which is in the range between and including a radial direction and an axial direction of the turbine wheel (71).

6. A variable geometry turbine according to claim 1, wherein said bypass channel (51) is selectively connectable to a flow of working fluid upstream of the section throat of the turbine by a sliding movement of said sliding element (5).

7. A variable geometry turbine according to claim 1, wherein said bypass channel (51) is selectively connectable to a flow of working fluid downstream of the section throat of the turbine by a sliding movement of said sliding element (5).

8. A variable geometry turbine according to claim 1, wherein an opening degree of said bypass channel (51) is variable.

9. A variable geometry turbine according to claim 8, wherein said opening degree of said bypass channel (51) is variable depending on an axial sliding position of said sliding element (5).

10. A variable geometry turbine according to claim 8, wherein said opening degree of said bypass channel (51) is variable dependent on a rotated position of said sliding element when rotated around the rotational axis of the turbine wheel (71).

11. A variable geometry turbine according to claim 1, wherein
said turbine wheel (71) is arranged in a turbine housing (1) having a flow path (111) for the working fluid to said turbine wheel (71), and a passage (15) connected to said flow path; said passage (15) has at least one opening (35) which is selectively opened or closed by said sliding element (5);
said passage (15) being connected to said bypass channel (51) via a hole (53), when said opening (35) is at least partially open.

12. A variable geometry turbine according to claim 11, wherein said opening (35) and said hole (53) are displaceable relatively to each other, and an opening degree of said passage (15) is governed by an overlapping degree of said opening (35) and said hole (53).

13. A variable geometry turbine according to claim 11, wherein said section throat of the turbine is equipped with at least one vane (33), and wherein said opening (35) is formed in said vane (33) and said hole (53) is formed in a portion of said sliding element (5) cooperating with said vane (33).

14. A variable geometry turbine according to claim 11, wherein said passage (15) is connected to a portion of the flow path (11) upstream said section throat of the turbine.

15. A variable geometry turbine according to claim 11, wherein said passage is connected to a portion of the flow path downstream said section throat of the turbine.

16. A turbocharger, comprising
a variable geometry turbine according to claim 1 for operation with exhaust gas of an engine as the working fluid, and
a compressor for compressing air to be supplied to the engine, wherein the turbine wheel and the compressor wheel are fixed to a common shaft (75).

17. A method for controlling a variable geometry turbine, said method comprising the steps of
providing a bypass channel connected to the outlet area of the turbine wheel in a sliding element for controlling section throat of the turbine,
selectively and variably connecting the bypass channel with the flow of working fluid, in order to guide an excess flow of working fluid to bypass the turbine wheel, and
releasing the excess flow of working fluid into the turbine outlet area.

18. A method according to claim 17, wherein the step of variably and selectively connecting the bypass channel comprises the step of varying an overlap of an opening from the working fluid flow path and an opening of the bypass channel by axially sliding movement of the sliding element.

19. The method according to claim 17, wherein the step of releasing the excess flow comprises ejecting the excess flow of working fluid in the flow direction of the flow of working fluid in the turbine outlet area.

20. A method according to claim 19, wherein the step of ejecting the excess flow of working fluid comprises the step of forming an accelerated and substantially cylindrically shaped gas layer surrounding the turbine wheel main flow, so that said gas layer locally reduces turbine wheel outlet pressure and improves turbine performance.

* * * * *